(No Model.)
J. A. JOHNSON.
REVERSIBLE CULTIVATOR SHOVEL.
No. 423,774. Patented Mar. 18, 1890.
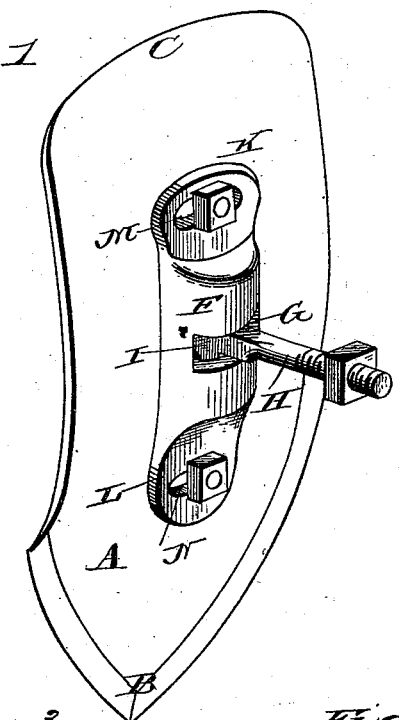
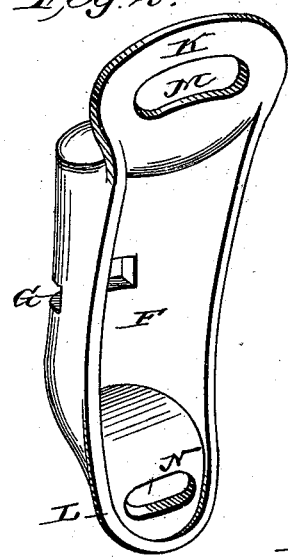
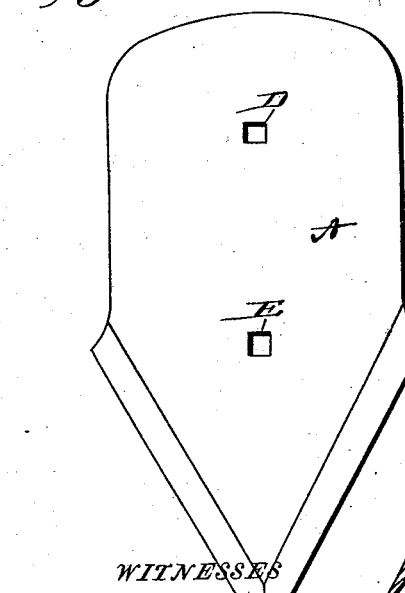
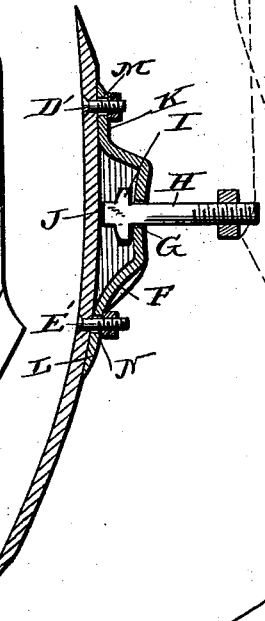
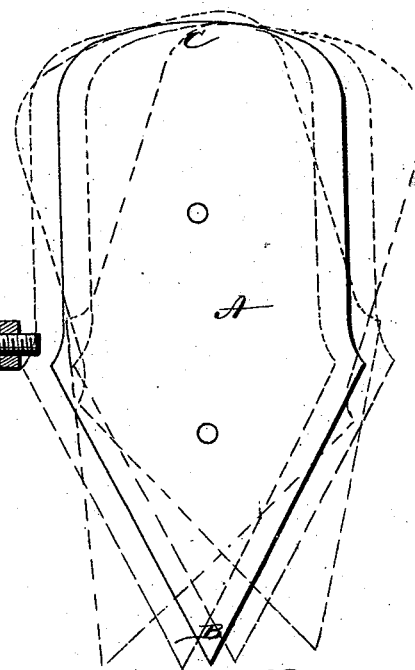
WITNESSES
INVENTOR
John A. Johnson

UNITED STATES PATENT OFFICE.

JOHN A. JOHNSON, OF MADISON, WISCONSIN.

REVERSIBLE CULTIVATOR-SHOVEL.

SPECIFICATION forming part of Letters Patent No. 423,774, dated March 18, 1890.

Application filed May 8, 1889. Serial No. 309,973. (No model.)

*To all whom it may concern:*

Be it known that I, JOHN A. JOHNSON, a citizen of the United States, and a resident of Madison, in the county of Dane and State of Wisconsin, have invented certain new and useful Improvements in Reversible Cultivator-Shovels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective rear view of my improved reversible cultivator-shovel with its removable bearing and attachments. Fig. 2 is a similar view of the shoe or bearing with the shovel and the fastening-bolts removed. Fig. 3 is a rear elevation of the shovel-blade detached from its bearing. Fig. 4 is a longitudinal sectional view of the shovel and attachments; and Fig. 5 is a front view of the shovel as affixed upon its shoe or bearing, the dotted lines indicating some of the various positions in which the shovel may be adjusted.

Like letters of reference denote corresponding parts in all the figures.

My invention relates to reversible blades or shovels for cultivators—that is to say, blades or shovels of that class which may be reversed upon the standard, so as to permit of the use of both ends of the blade or shovel at will; and it consists in certain improvements upon the device described and claimed in my Letters Patent No. 390,479, dated October 2, 1888, whereby I am enabled to greatly increase or multiply the positions or adjustments of the reversible cultivator blade or shovel relative to the fixed standard, substantially as hereinafter more fully described.

In the accompanying drawings, the letter A designates the reversible blade or shovel, which is made of steel and provided at one end with a sharpened point B and at the other or opposite end with a curved and sharpened edge C. Through the middle part of the body of the plate are punched two holes D and E, which are countersunk on the front side to receive the heads of the bolts D' and E', which said heads, after the bolts have been properly inserted, are ground off perfectly smooth and even with the front side of the shovel-plate.

The bearing or shoe, whereby the shovel is fastened upon the standard, consists of an elongated box or casting F, the hollow middle part of which has a transverse rectangular slot G for the insertion of the bolt H, whereby the shovel is fastened upon the cultivator-standard. This bolt H has a square part which projects through the rectangular slot G and is provided adjacent to said square part with a cross-head I, the top or end of which is rounded off and terminates in a projection J. When the bolt has been turned so that its cross-head will stand at right angles to slot G, the shovel-blade may be drawn tightly up against the face of the shoe by turning the nuts at the inner ends of the fastening-bolts D' and E'; but when, on the other hand, the shoe is inserted upon bolt H without turning cross-head I at right angles to the slot the shoe might, even when the cross-head is in this position, get a slight bite or bearing on the bolt, but not sufficient to hold it firmly in place, and to guard against such possible misplacement the bolt projection J is made long enough to strike against the back part of the shovel when the cross-head stands in a line with the slot, thereby preventing the shovel-blade from being drawn up tightly against the shoe, and thus indicating at a glance whether bolt H is in its proper position for holding the shovel firmly in place or not. It will also be seen that by having the box F semicircular and hollow at its middle part, where the transverse slot G is cut and where it is fastened to the standard, the blade may be turned to either side and the box F still present a similar bearing-surface to the standard. By this adjustment, which may be made by simply loosening the nut of the bolt H, the blades may be made to throw the dirt toward or away from the plants in varying degrees.

The shoe F is provided with a solid top extension K, having an oblong slot M, and a bottom extension L, having an oblong slot N, as will appear more clearly by reference to Fig. 2 of the drawings. These two slots M and N are curved in the arc of a circle, the distance from the center of this circle to any point in the two slots being the same. It follows that by loosening the nuts of the fastening-bolts D' and E' the shovel may be "set" or tilted into the various oblique positions indicated in Fig. 5 by the dotted outlines, and may be fastened in any one of these several positions by again tightening up the nuts. Care must be taken, however, to make these curved or segmental slots M and N of sufficient size to also permit lateral adjustment of the shovel— i. e., moving the same sidewise upon the shoe or bearing F without tilting it or placing it in an oblique position. In this manner the adjustment will admit of five different adjustments of the shovel upon its shoe, besides reversing the shovel, viz: It may be set straight, as shown in full line in Fig. 5; it may be moved bodily to the right in a straight up-and-down position, and the same to the left; it may be tilted with its upper end to the right and lower end to the left, or, finally, it may be tilted in the opposite direction, with its upper end to the left and the lower to the right. It is obvious that these several adjustments are independent of whether the point of the shovel-blade is uppermost or lowermost.

It will be seen that I construct a blade and attachments which though comprising few and simple parts is yet easily susceptible of a great number of adjustments for adapting it to different soils, various crops and stages of growth of said crops, and thereby greatly increase the efficiency and usefulness of my device.

Having thus described my invention, I claim and desire to secure by Letters Patent of the United States—

The combination of the reversible cultivator-blade, the hollow bearing or shoe F, having its middle part semicircular, said middle part having a central transverse slot, bottom and top extensions with slots curved in arcs of a common circle, the nutted bolts by which the reversible blade is fastened adjustably upon the slotted top and bottom extensions of the shoe, and the bolt H, having a square part, as shown, cross-head I, and projection J, said bolt being adapted to fasten said blade adjustably to the standard, and all combined to co-operate in the manner set forth.

In testimony that I claim the foregoing as my own I have hereunto affixed my signature in presence of two witnesses.

JOHN A. JOHNSON.

Witnesses:
A. E. PROUDFIT,
J. H. NICHOLS.